United States Patent
Hehle et al.

(10) Patent No.: US 10,473,017 B2
(45) Date of Patent: Nov. 12, 2019

(54) EXHAUST-GAS AFTERTREATMENT SYSTEM FOR AN INTERNAL COMBUSTION ENGINE, INTERNAL COMBUSTION ENGINE HAVING AN EXHAUST-GAS AFTERTREATMENT SYSTEM, AND USE OF AN AIR FLOW NOZZLE

(71) Applicant: MTU FRIEDRICHSHAFEN GMBH, Friedrichshafen (DE)

(72) Inventors: Marc Hehle, Constance (DE); Olaf Schäfer-Welsen, Friedrichshafen (DE); Claudia Riedel, Friedrichshafen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 35 days.

(21) Appl. No.: 15/570,431

(22) PCT Filed: Apr. 21, 2016

(86) PCT No.: PCT/EP2016/000646
§ 371 (c)(1),
(2) Date: Oct. 30, 2017

(87) PCT Pub. No.: WO2016/173700
PCT Pub. Date: Nov. 3, 2016

(65) Prior Publication Data
US 2018/0149060 A1     May 31, 2018

(30) Foreign Application Priority Data

Apr. 30, 2015   (DE) .................. 10 2015 208 016

(51) Int. Cl.
*F01N 3/20*   (2006.01)
*F01N 3/28*   (2006.01)
*F02B 37/00*  (2006.01)

(52) U.S. Cl.
CPC ......... *F01N 3/2892* (2013.01); *F01N 3/2066* (2013.01); *F01N 2340/06* (2013.01);
(Continued)

(58) Field of Classification Search
CPC .. F01N 3/2066; F01N 3/2892; F01N 2340/06; F01N 2570/14; F01N 2610/00;
(Continued)

(56) References Cited

U.S. PATENT DOCUMENTS 6,361,754 B1    3/2002  Peter-Hoblyn et al.
6,449,947 B1 *  9/2002  Liu .................... B01D 53/9431
                                                          60/286

(Continued)

FOREIGN PATENT DOCUMENTS

CN    101979848 A    2/2011
DE    102005006260 A1  8/2006
(Continued)

*Primary Examiner* — Patrick D Maines
*Assistant Examiner* — Dapinder Singh
(74) *Attorney, Agent, or Firm* — Lucas & Mercanti, LLP; Klaus P. Stoffel (57) ABSTRACT

An exhaust-gas aftertreatment system for an internal combustion engine, having a catalyst device, which is designed to catalytically react at least one exhaust-gas component with a reactant, and a reactant-metering device, which is arranged upstream of the catalyst device along a flow path of the exhaust gas through the exhaust-gas aftertreatment system. The reactant-metering device has at least one exhaust-gas flow nozzle.

18 Claims, 4 Drawing Sheets

(52) U.S. Cl.
CPC ...... *F01N 2570/14* (2013.01); *F01N 2610/00* (2013.01); *F01N 2610/1453* (2013.01); *F02B 37/00* (2013.01); *Y02T 10/24* (2013.01)

(58) Field of Classification Search
CPC ... F01N 2610/1453; F02B 37/00; Y02T 10/24
USPC .................. 60/274, 286, 295, 299–301, 317
See application file for complete search history.

(56) References Cited

U.S. PATENT DOCUMENTS

| | | | |
|---|---|---|---|
| 8,596,063 | B2 | 12/2013 | Brown |
| 2007/0101700 | A1* | 5/2007 | Masaki ............... B01F 3/04049 60/286 |
| 2010/0319342 | A1* | 12/2010 | Brown .................... F01N 3/035 60/598 |
| 2014/0369898 | A1* | 12/2014 | Miller ................... B01F 5/0451 422/168 |
| 2015/0108236 | A1 | 4/2015 | Buelow et al. |
| 2016/0281563 | A1 | 9/2016 | Schimik |

FOREIGN PATENT DOCUMENTS

| | | |
|---|---|---|
| DE | 102008009564 A1 | 8/2009 |
| DE | 102013005192 A1 | 9/2014 |
| EP | 1669566 A1 | 6/2006 |
| EP | 2769762 A1 | 8/2014 |
| WO | 2013112170 A1 | 8/2013 |

* cited by examiner

EXHAUST-GAS AFTERTREATMENT SYSTEM FOR AN INTERNAL COMBUSTION ENGINE, INTERNAL COMBUSTION ENGINE HAVING AN EXHAUST-GAS AFTERTREATMENT SYSTEM, AND USE OF AN AIR FLOW NOZZLE

The present application is a 371 of International application PCT/EP2016/000646, filed Apr. 21, 2016, which claims priority of DE 10 2015 208 016.1, filed Apr. 30, 2015, the priority of these applications is hereby claimed and these applications are incorporated herein by reference.

BACKGROUND OF THE INVENTION

The invention relates to an exhaust-gas aftertreatment system for an internal combustion engine, to an internal combustion engine having such an exhaust-gas aftertreatment system, and to use of an air flow nozzle.

In the case of exhaust-gas aftertreatment systems for internal combustion engines, which have a catalytic converter device which is designed for the catalytic conversion of at least one exhaust-gas component with a reactant, the requirement arises that the reactant has to be metered into a flow path of the exhaust gas. For this purpose, a reactant-metering device is typically arranged upstream of the catalytic converter device, as seen along a flow path of the exhaust gas through the exhaust-gas aftertreatment system. For efficient conversion of the exhaust-gas component with the reactant at the catalytic converter device, the reactant has to be intimately mixed with the exhaust gas, preferably evaporated, and optionally converted chemically to form a component which then ultimately reacts at the catalytic converter device. For this purpose, long metering and mixture preparation sections are generally required, especially in the large engine range, which increases the construction space required for the exhaust-gas aftertreatment system. If a turbine, for example of an exhaust-gas turbocharger, is provided in the exhaust-gas aftertreatment system, said turbine can be used as a mixer by the reactant-metering device being arranged upstream of the turbine. This considerably shortens the mixing section. However, it has been shown that the reactant-metering device typically has to operate counter to the exhaust-gas pressure upstream of the catalytic converter device and in particular upstream of the turbine, wherein, in particular in the latter case, a pressure of approximately 5 to 6 bar can prevail in an exhaust-gas line into which the reactant is intended to be metered. If a pressure atomizer is used, the latter requires a reactant admission pressure of at least 10 bar, preferably of more than 10 bar, in order to ensure an atomization quality sufficient for preparation of the reactant in respect of an efficient reaction at the catalytic converter device.

The pressure difference which drops via a pressure atomizer nozzle and is intended for generating a certain atomization quality depends squarely here on the flow of reaction medium through the pressure atomizer nozzle, i.e. on a desired metering quantity. This gives rise to the necessity of a high dynamic range for the admission pressure of the pressure atomizer nozzle. The high pressures in particular required in this respect are achievable only with a comparatively high degree of complexity, which is also associated with high costs. Furthermore, pressure atomizers typically generate a comparatively coarse spray, i.e. in particular comparatively large reactant droplets, and therefore, for the mixture preparation, long residence times in the exhaust-gas aftertreatment system are required in order to completely vaporize the reactant and to mix same intimately with the exhaust gas. Atomizer nozzles are also known which generate a spray with the aid of compressed air. This means a high degree of technical complexity in order to provide compressed air in the form of pressure vessels and/or by means of a compressor.

SUMMARY OF THE INVENTION

The invention is based on the object of providing an exhaust-gas aftertreatment system, an internal combustion engine and use of an air flow nozzle, in which the disadvantages mentioned do not occur.

The object is achieved in particular by an exhaust-gas aftertreatment system for an internal combustion engine being provided, said exhaust-gas aftertreatment system having a catalytic converter device which is configured for the catalytic conversion of at least one exhaust-gas component with a reactant. In addition, the exhaust-gas aftertreatment system has a reactant-metering device which is arranged upstream of the catalytic converter device, as seen along a flow path of the exhaust gas through the exhaust-gas aftertreatment system. The exhaust-gas aftertreatment system is distinguished in that the reactant-metering device has at least one exhaust-gas flow nozzle. An "exhaust-gas flow nozzle" is understood as meaning an atomizer device which is designed as an atomizer device supported by exhaust gas, wherein the latter is configured in particular in order to atomize the reactant—in particular exclusively—by means of the exhaust gas flow along the flow path. In particular, the exhaust-gas flow nozzle is configured in order—preferably exclusively—to use aerodynamic forces of the exhaust-gas flow, in particular shearing forces, for atomizing the reactant. A compressed gas source which is configured for supporting the atomization process, in particular a compressed air vessel and/or a compressor, is preferably dispensed with; therefore, the reactant-metering device preferably does not have a compressed gas source which is configured for supporting the atomization process, or is free of such a compressed gas source. The exhaust-gas aftertreatment system has advantages over the prior art. In particular, it is possible with an exhaust-gas flow nozzle to generate a very fine spray having in particular a small droplet size such that a mixing section upstream of the catalytic converter device can be reduced in size—in particular because of short vaporization times of the spray. This reduces the construction space required by the exhaust-gas aftertreatment system. Furthermore, the operation of an exhaust-gas flow nozzle is based on the fact that the reactant is substantially sheared off by aerodynamic forces of the exhaust gas flowing in the exhaust-gas line, in which the reactant-metering device is arranged, and is thereby atomized. The atomization effect therefore is at any rate substantially not based on a pressure difference, which drops via the exhaust-gas flow nozzle, for the reactant, but on the contrary on the aerodynamic forces acting in the exhaust-gas line, and in particular on the shearing effect of said forces. It is therefore not necessary, in the case of an exhaust-gas flow nozzle, to provide such a high pressure difference as is required in the case of a pressure atomizer. For example, the pressure difference which drops via the exhaust-gas flow nozzle can be reduced to approximately 1 bar because it only still serves for supplying reactant and no longer for the atomization thereof. It is also very substantially possible here to keep the pressure difference which drops via the exhaust-gas flow nozzle or the admission pressure of the reactant upstream of the exhaust-gas flow nozzle very substantially independent of the desired metering quantity, consequently the mass or volumetric flow of reactant via the exhaust-gas flow nozzle. The spray quality is also very substantially independent of the metering quantity. The exhaust-gas aftertreatment system can therefore be realized in a significantly less complex and simpler manner and with less complexity and can be configured more cost-effectively. In particular, conventional pumps can be used for conveying the reactant. Furthermore, pressure sources, such as compressed air vessels or compressors for supporting the atomization process can be omitted.

The term "exhaust-gas component" refers here and below to a chemical substance which is contained by the exhaust gas of the internal combustion engine and which is catalytically converted at the catalytic converter device. It can be, but does not absolutely have to be, a chemical substance which arises during combustion in the internal combustion engine. It can in fact also be a chemical substance which is not or is not completely converted during the combustion. For example, the exhaust-gas component can be nitrogen oxides or oxygen.

The term "reactant" is understood as meaning a reagent which is supplied to the exhaust flow downstream of the combustion and is itself converted together with the exhaust-gas component at the catalytic converter device, or which constitutes a precursor component which is converted in the exhaust-gas flow upstream of the catalytic converter device, wherein a product of this conversion ultimately reacts with the exhaust-gas component at the catalytic converter device. The reactant can be, for example, a reducing agent, in particular urea, ammonia—optionally in the form of liquid gas—or a urea/water solution, or a hydrocarbon. In this respect, "conversion with a reactant" is also understood as meaning a catalytic conversion of the at least one exhaust-gas component with a product, in particular ammonia, formed from the reactant.

An exemplary embodiment of the exhaust-gas aftertreatment device is preferred in which the catalytic converter device is configured as an oxidation catalytic converter. In this case, the exhaust-gas component is oxygen, and the reactant is preferably a hydrocarbon which is oxidized at the oxidation catalytic converter with the oxygen as the exhaust-gas component.

An exemplary embodiment of the exhaust-gas aftertreatment system is particularly preferred, in which the catalytic converter device is designed as a catalytic converter for the selective catalytic reduction of nitrogen oxides (SCR catalytic converter). In this case, the exhaust-gas component is a nitrogen oxide or a mixture of nitrogen oxides, in particular nitrogen dioxide and/or nitrogen monoxide, wherein the reactant is a reducing agent, in particular a urea-water solution.

The exhaust-gas flow nozzle is preferably designed as an air flow nozzle driven by an exhaust-gas flow, in particular as an air blast atomizer driven by an exhaust-gas flow, or has at least one such air flow nozzle, in particular such an air blast atomizer. Air flow nozzles are generally known from aircraft engine building as atomizers for fuel. Such an air flow nozzle has at least one film applicator, to which a liquid film can be applied. The liquid film can be transported in a manner driven by a shearing stress to a shearing edge of the film applicator where said liquid film is atomized by aerodynamic shearing forces of a gas mass flow, here the exhaust-gas flow, flowing past the film applicator or flowing around the film applicator. The aerodynamic gas forces shear off the thin liquid film at the shearing edge of the film applicator, wherein typically initially relatively large droplets arise which move relatively slowly with the gas flow. Aerodynamic shearing forces furthermore also act in the gas flow on said droplets, which leads to secondary disintegration and ultimately to very fine atomization. In the case of such an air flow nozzle, a very high dynamic range in the metering quantity with constant spray properties arises.

An exemplary embodiment of the exhaust-gas aftertreatment system is preferred, which is distinguished in that a turbine, preferably the turbine of a turbocharger, is provided upstream of the catalytic converter device. The reactant-metering device is preferably arranged upstream of the turbine. It is then possible to use the turbine as a mixer, which furthermore considerably shortens the mixing section for the reactant.

The reactant-metering device is preferably arranged close to the turbine, particularly preferably as close as possible thereto. The high flow rates acting close to an inlet of the turbine have a particularly favorable effect here on the atomization properties of the exhaust-gas flow nozzle. Particularly high aerodynamic forces which are also favorable for the atomization properties of the exhaust-gas flow nozzle also act in this region. By contrast, the pressure, which is comparatively high in this region, in the exhaust-gas line does not have a negative effect since the exhaust-gas flow nozzle is not dependent on a high positive reactant pressure for efficient atomization of the reactant.

An exemplary embodiment of the exhaust-gas aftertreatment system is preferred, which is distinguished in that the reactant-metering device is arranged in or on an inlet portion of the turbine, or is integrated in the inlet portion. It is thereby possible to arrange the reactant-metering device particularly close to the turbine. Particularly preferably, the reactant-metering device is formed integrally with the turbine. The turbine and the reactant-metering device can thus be handled and installed as one component, which is logistically particularly favorable and is associated with as little complexity as possible and low costs.

An exemplary embodiment of the exhaust-gas aftertreatment system is preferred, which is distinguished in that the reactant-metering device is arranged in an exhaust-gas pipe of the exhaust-gas aftertreatment system, preferably upstream of a turbine. An exemplary embodiment in which the reactant-metering device is arranged in the one exhaust-gas manifold or exhaust-gas collector, preferably upstream of a turbine, is preferred in particular.

An exemplary embodiment of the exhaust-gas aftertreatment system is preferred, which is distinguished in that the exhaust-gas flow nozzle has at least one film applicator. The film applicator preferably engages—as seen in the circumferential direction—in a manner concentrically encircling a main flow direction of the exhaust gas in a line portion of the exhaust-gas aftertreatment system. The film applicator is preferably fluidically connected—preferably at its upstream end—to a concentrically encircling annular channel for the supply with reactant. The annular channel can also be arranged in a different position relative to the film applicator, for example centrally on the latter—in the main flow direction. In particular, it is possible for the film applicator to be designed in a virtually tubular manner or in the manner of a tubular portion, wherein it is preferably arranged concentrically in the line portion. The film applicator and/or the line portion can preferably be formed conically. The annular channel is preferably arranged at the upstream end of the film applicator, and therefore the flow direction of the reactant on the film applicator corresponds to the main flow direction of the exhaust gas in the line portion. The exhaust-gas flow can therefore additionally contribute to conveying the reactant along the film applicator as far as the shearing edge thereof. At the shearing edge of the film applicator, the reactant is sheared off by the aerodynamic forces of the exhaust-gas flow. The configuration proposed here of the film applicator, and of its fastenings and feed lines, can be produced in a particularly uncomplicated and simple manner, in particular by simple installation or in a generative manufacturing process, for example 3D printing. It is furthermore cost-effective.

The fact that the film applicator—as seen in the circumferential direction—engages in a manner concentrically encircling a main flow direction of the exhaust gas in the line portion of the exhaust-gas aftertreatment system means in particular that the film applicator engages around a radially inner region of the line portion and/or around the latter itself, through which line portion exhaust gas flows during the operation of the exhaust-gas aftertreatment system. The film applicator preferably has a radially outer region, around which exhaust gas flows during the operation of the exhaust-gas aftertreatment system. The exhaust gas flows here in particular through the radially inner region around which the film applicator engages, wherein the exhaust gas at the same time flows around the film applicator in the radially outer region. The film applicator engages in particular firstly around a central recess through which exhaust gas can flow, wherein the film applicator is secondly preferably arranged and in particular held at a radial distance from an inner wall of the line portion.

The film applicator is preferably held in the line portion by means of at least one web, wherein the at least one web is preferably secured firstly on a wall of the line portion and secondly on the annular channel, wherein the film applicator itself is, for its part, arranged on the annular channel. In particular, the annular channel preferably supports the film applicator. The at least one web is preferably also configured for supplying the annular channel with reactant, wherein said web has a passage bore which in particular connects the annular channel to a supply line outside of the line portion. A plurality of webs are particularly preferably provided, the webs holding the film applicator and the annular channel concentrically in the line portion and preferably being arranged at identical angular distances from one another, i.e. rotationally symmetrically about the film applicator and the annular channel. In particular, an exemplary embodiment with three webs is preferred.

It is possible for each web to have a passage bore for reactant. The annular channel is preferably divided into a plurality of separate chambers, in particular three chambers, wherein each of the chambers is preferably fluidically connected to in each case one of the webs. In this manner, a separate supply of the chambers of the annular channel with reactant via the webs can be provided. This facilitates metering of the reactant.

The reactant feed lines formed in such a manner are particularly preferably designed to be switchable, wherein activatable valve devices by means of which the fluid paths leading to the annular channel via the webs are openable and closable are provided in particular upstream of the webs or in a manner integrated in the webs. Very simple adaptation of metering of the reactant can thereby take place.

It is possible for a swirl-generating means, in particular a swirl grating, to be arranged on the film applicator and/or on the annular channel in order to impart a swirl to the exhaust-gas flow which flows around the film applicator and flows through the film applicator. This increases the efficiency of atomization by means of the exhaust-gas flow nozzle.

An exemplary embodiment of the exhaust-gas aftertreatment system is also possible, in which at least one flat film applicator—in particular in the form of a flat blade—of the exhaust-gas flow nozzle is arranged in a line portion of the exhaust-gas aftertreatment system. The at least one flat film applicator is preferably arranged centrally in the line portion.

An exemplary embodiment of the exhaust-gas aftertreatment system is also preferred, which is distinguished in that the reactant-metering device has a plurality of exhaust-gas-conducting elements which in particular—as seen in the circumferential direction—are arranged spaced apart from one another on a swirl-generating device for the exhaust gas, wherein at least one of the exhaust-gas-conducting elements is designed as a film applicator. The swirl-generating device is preferably configured in order to deflect the exhaust gas radially in regions. An axial direction is understood here as meaning in particular a main flow direction of the exhaust gas along a line portion of the exhaust-gas aftertreatment system, in which the reactant-metering device is arranged, wherein a radial direction is perpendicular to the axial direction. A circumferential direction engages concentrically around the axial direction. The exhaust-gas-conducting elements are preferably configured in order to impart a swirl to the exhaust gas flowing radially around them or flowing radially between them.

Preferably, a plurality of the exhaust-gas-conducting elements, particularly preferably all of the exhaust-gas-conducting elements, are designed as film applicators. To this extent, an exemplary embodiment of the exhaust-gas aftertreatment system is in particular also preferred, which is distinguished in that the reactant-metering device has a plurality of film applicators which in particular are arranged as—as seen in the circumferential direction—exhaust-gas-conducting elements which are spaced apart from one another on a swirl-generating device for the exhaust gas.

In a preferred exemplary embodiment, the line portion has a constriction which is formed by a mounting plate which extends radially inward from an inner wall of the line portion, wherein the mounting plate has a central recess through which exhaust gas can flow. The exhaust-gas-conducting elements and/or film applicators are preferably arranged on the mounting plate, wherein a baffle plate is arranged on the exhaust-gas-conducting elements and/or film applicators in turn—in a manner spaced apart in the axial direction from the mounting plate by the exhaust-gas-conducting elements and/or film applicators. The baffle plate forms an upstream end of the swirl-generating device, wherein the mounting plate forms a downstream end of the swirl-generating device. Exhaust gas flowing up from upstream is conducted radially outward by the baffle plate, and flows between the exhaust-gas-conducting elements and/or film applicators to the recess where it is in turn deflected in the axial direction and flows further axially through the recess of the mounting plate. The exhaust-gas-conducting elements and/or film applicators act here as guide vanes which induce swirling in the exhaust gas flowing radially between them. For this purpose, they preferably have a suitable aerodynamic geometry.

The baffle plate preferably has a convex or curved end side which faces the approaching exhaust gas and conducts the approaching exhaust gas radially outward in a particularly efficient manner. However, the end side can also be of flat design. On a downstream end surface, on which the film applicators are arranged, the baffle plate preferably has a flow-conducting geometry, preferably a central dome or bead, which is arranged centrally and in this respect is surrounded concentrically by the film applicators. This flow-conducting geometry serves for efficient deflection of the exhaust gas, which is approaching between the film applicators, in the axial direction, and therefore for conducting the exhaust gas through the recess in the mounting plate. However, the flow-conducting geometry can also be designed in any other form, in particular convexly, concavely, or else as a bore, in particular also as a passage bore, through which exhaust gas can flow.

At least one annular groove for supplying the film applicators with reactant is preferably arranged in the mounting plate. The mounting plate preferably has at least two, in particular precisely two, separate annular grooves, wherein various film applicators, in particular film applicators which are directly adjacent to one another, are fluidically connected to various annular grooves. The feed lines, which are formed via the annular grooves, for the reactant are preferably switchable, and particularly preferably are adjustable, controllable and/or regulable with respect to their throughflow cross section, and in particular each annular groove is preferably assigned an activatable valve.

It is possible for an additional swirl-generating means to be arranged on the upstream end side of the baffle plate, said swirl-generating means additionally imparting a swirl to the approaching exhaust gas. Said swirl-generating means can have, for example, a plurality of guide blades which are arranged on the end surface.

The atomization can take place particularly efficiently by the film applicators serving as exhaust-gas-conducting elements of a swirl-generating device because the exhaust gas having a swirl generates particularly high aerodynamic shearing forces at the film applicators. Furthermore, it is possible for relatively large droplets which have become detached from a film applicator to impact against an adjacent film applicator—as seen in the circumferential direction—and form a further liquid film there which, for its part, is in turn atomized by shearing forces of the exhaust-gas flow.

An exemplary embodiment of the exhaust-gas aftertreatment system is also preferred, in which at least one film applicator, preferably a plurality of film applicators, is/are arranged on a circumferential wall of a conducting portion, preferably between guide vanes which are likewise arranged on the circumferential wall and impart a swirl to the exhaust-gas flow and/or radially deflect the latter. The guide vanes which are heated by the exhaust gas contribute here to the reactant which is atomized at the shearing edges of the film applicators vaporizing particularly rapidly.

In a preferred exemplary embodiment of the exhaust-gas aftertreatment system, it is provided that the at least one film applicator is temperature-controllable, in particular coolable. It is possible in particular here for the at least one film applicator to be fluidically connected to a cooling line via which a cooling medium can be supplied to the film applicator. Alternatively or additionally, cooling of the at least one film applicator via a thermoelectric element, for example a Peltier element, or in another suitable manner is also possible. Cooling of the film applicator has the advantage that the typically heat-sensitive reactant can be stabilized on the film applicator, and therefore the reactant is not prematurely aged, disintegrated or destroyed. It is also possible for the at least one film applicator to be heatable—electrically or by being acted upon with a heating medium. This can be favorable in particular in a starting phase of an internal combustion engine in order to rapidly reach a target temperature at the shearing edge of the film applicator. By means of temperature control of the film applicator, the shearing edge can be kept—preferably controlled or regulated—within a predetermined target temperature range.

Additionally or alternatively, at least one of the guide vanes is preferably temperature-controllable, in particular coolable.

An exemplary embodiment of the exhaust-gas aftertreatment system is also preferred, which is distinguished in that the reactant-metering device has at least one feed line for reactant to the at least one film applicator, wherein the at least one feed line is preferably switchable. In particular, a switchable or activatable valve, by means of which the feed line is blockable and releasable for the reactant, is preferably arranged in the feed line. A variably activatable valve is preferably provided, by means of which a variable control of a reactant flow through the feed line can be implemented—in particular in a controlled or regulated manner. The reactant-metering device preferably has a plurality of feed lines to a plurality of film applicators, wherein each film applicator is preferably assigned a feed line. It is possible here for a plurality of film applicators to be assigned a common feed line. In particular, it is possible for at least two groups of film applicators to exist, wherein various groups of film applicators are assigned various feed lines. The various feed lines are preferably switchable or activatable separately, wherein they particularly preferably have separately switchable or activatable valves.

Via the feed line and in particular via a switchable or activatable feed line, it is possible in a particularly simple and preferably at the same time sensitive manner to influence, in particular to control or to regulate, a reactant quantity to be metered into the exhaust gas.

An exemplary embodiment of the exhaust-gas aftertreatment system is also preferred, which is distinguished in that the reactant-metering device has at least one swirl-generating means which is configured in order to impart a swirl to exhaust gas flowing through the reactant-metering device or around the reactant-metering device. This can be, for example, a swirl grating, guide vanes, guide plates or other suitable elements. The swirl-generating means is preferably arranged at an upstream end of the reactant-metering device, and therefore the exhaust gas has already passed the reactant-metering device while swirling. By this means, the quality of the atomization by the exhaust-gas flow nozzle can be further improved with a simultaneously optimized overall pressure loss.

An exemplary embodiment of the exhaust-gas aftertreatment system is also preferred, which is distinguished by a flushing device which is configured for flushing the at least one feed line. The flushing device preferably has a fluid connection which is configured for connecting the feed line to a compressed air source, in particular to a charge air tract of an internal combustion engine, preferably downstream of a compressor, or to another compressed air source or compressed gas source for flushing and at the same time for separating the feed line from a reactant reservoir. The at least one feed line can be emptied—in particular before its deactivation—by means of the flushing device, and therefore thermal damage, in particular destruction of reactant arranged in the feed line, can be avoided.

The object is also achieved by an internal combustion engine being provided which has an exhaust-gas aftertreatment system according to one of the previously described exemplary embodiments. The advantages which have already been explained in conjunction with the exhaust-gas aftertreatment system are in particular implemented here in conjunction with the internal combustion engine.

An exemplary embodiment of an internal combustion engine which has an exhaust-gas turbocharger, wherein a turbine of the turbocharger is arranged in the exhaust-gas aftertreatment system, is particularly preferred. The turbine is preferably arranged here upstream of the catalytic converter device of the exhaust-gas aftertreatment system, wherein the reactant-metering device is preferably arranged upstream of the turbine, in particular close to the turbine, preferably as close as possible to the turbine, and particularly preferably in or on an inlet portion of the turbine, or is integrated in the inlet portion. An exemplary embodiment of the internal combustion engine is also preferred, in which the reactant-metering device is formed integrally with the turbine. Particularly favorable atomization qualities and a particularly short mixing section for the reactant arise in this case.

The internal combustion engine is preferably designed as a piston engine. In a preferred exemplary embodiment, the internal combustion engine serves for driving in particular heavy land vehicles or watercraft, for example mine vehicles, trains, wherein the internal combustion engine is used in a locomotive or a rail car, or ships. Use of the internal combustion engine for driving a vehicle serving for defence, for example a tank, is also possible. An exemplary embodiment of the internal combustion engine is preferably also used in a stationary manner, for example for the stationary supply of energy in the emergency power mode, permanent load mode or peak load mode, wherein the internal combustion engine in this case preferably drives a generator. Stationary use of the internal combustion engine for driving auxiliary units, for example fire extinguishing pumps on offshore drilling rigs, is also possible. Furthermore, use of the internal combustion engine in the sphere of conveying fossil raw materials and in particular fuels, for example oil and/or gas, is possible. Use of the internal combustion engine in the industrial sphere or in the construction sphere, for example in a construction or building machine, for example in a crane or an excavator, is also possible. The internal combustion engine is preferably designed as a diesel engine, as a gasoline engine, as a gas engine for operation with natural gas, biogas, special gas or another suitable gas. In particular if the internal combustion engine is designed as a gas engine, it is suitable for use in a cogeneration heating plant for stationary generation of energy.

An exemplary embodiment of the exhaust-gas aftertreatment system or of the internal combustion engine is preferred, in which it is provided that the catalytic converter device is configured as a catalytic converter for the selective catalytic reduction of nitrogen oxides (SCR catalytic converter). The reactant-metering device here is preferably configured for metering a reducing agent, in particular a urea-water solution, into the exhaust-gas flow of the exhaust-gas aftertreatment system.

The object is finally also achieved by use of an air flow nozzle being provided, wherein the air flow nozzle is used in a reactant-metering device or as a reactant-metering device for an exhaust-gas aftertreatment system, in particular for an exhaust-gas aftertreatment system according to one of the previously described exemplary embodiments, in particular as an exhaust-gas flow nozzle. By means of the use of an air flow nozzle as a reactant-metering device or in a reactant-metering device and in particular as an exhaust-gas flow nozzle, the advantages which have already been explained in conjunction with the exhaust-gas aftertreatment system and/or the internal combustion engine are in particular achieved.

Use is preferably made of an air flow nozzle designed as an air blast atomizer, or of an air flow nozzle which has at least one air blast atomizer.

The invention is explained in more detail below with reference to the drawing, in which:

DETAILED DESCRIPTION OF THE INVENTION

Figure 1:
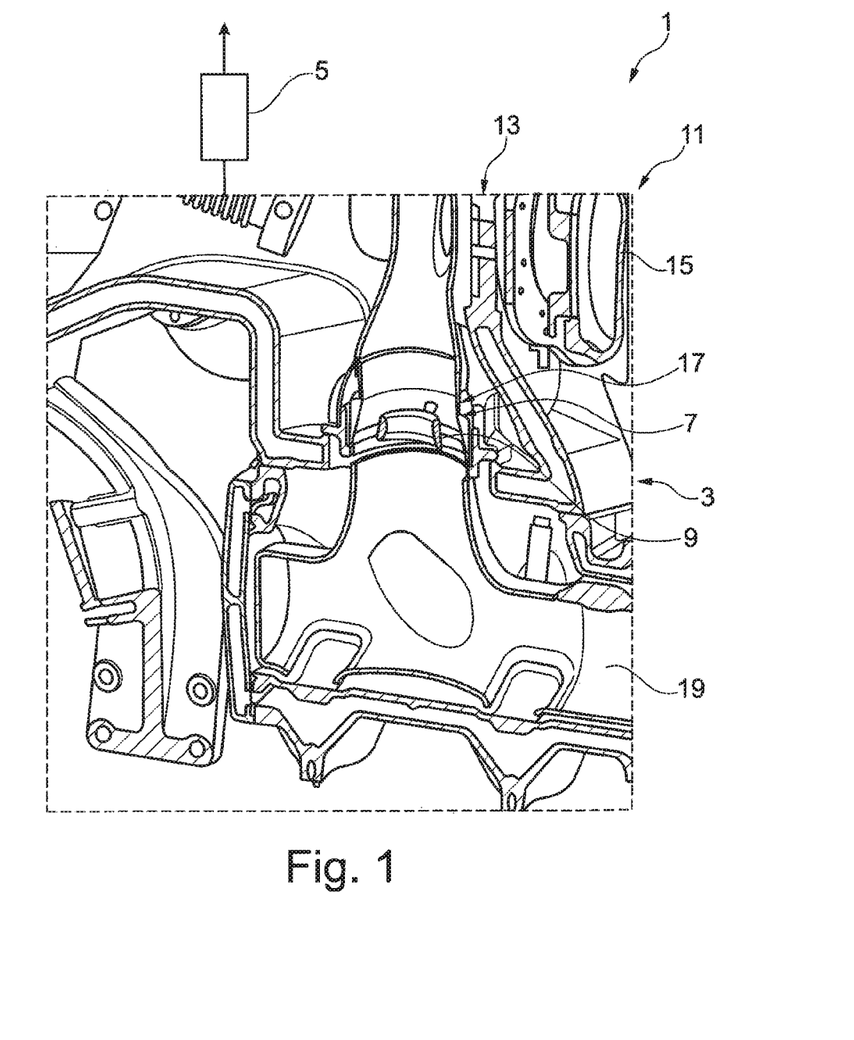
FIG. 1 shows a detailed illustration of an exemplary embodiment of an internal combustion engine with an exhaust-gas aftertreatment system.

FIG. 1 shows a detailed sectional view of an exemplary embodiment of an internal combustion engine 1 which has an exhaust-gas aftertreatment system 3. The latter has a catalytic converter device 5 which is merely indicated schematically here and is configured for the catalytic conversion of at least one exhaust-gas component with a reactant. The catalytic converter device 5 here is preferably designed as a catalytic converter for the selective catalytic reduction of nitrogen oxides (SCR catalytic converter), wherein nitrogen oxides, in particular nitrogen monoxide or nitrogen dioxide, as the exhaust-gas component are converted with a reducing agent, in particular with ammonia released from a urea-water solution, as reactant, at the catalytic converter.

A reactant-metering device 7 which has at least one, here precisely one, exhaust-gas flow nozzle 9 is arranged upstream of the catalytic converter device 5, as seen along a flow path of the exhaust gas through the exhaust-gas aftertreatment system 3. It is possible by means of the exhaust-gas flow nozzle 9 to generate a very fine spray without a high differential pressure having to be formed via the exhaust-gas flow nozzle 9. The exhaust-gas flow nozzle is therefore constructed very efficiently and at the same time simply and can be supplied cost-effectively.

The exemplary embodiment of the internal combustion engine 1 that is illustrated here has a turbocharger 11, wherein a turbine 13 of the turbocharger 11 is arranged in the exhaust-gas aftertreatment system 3 upstream of the catalytic converter device 5. The reactant-metering device 7 is in turn arranged upstream of the turbine 13. The turbine 13 uses a shaft to drive a compressor 15 which is provided in a charge path (not illustrated specifically) of the internal combustion engine 1 for compressing combustion air or a combustion air and fuel mixture.

The exhaust-gas flow nozzle 9 is arranged here in particular in an inlet portion 17 of the turbine 13, wherein it is possible that it is integrated in the inlet portion 17 and/or is formed integrally with the turbine 13.

Exhaust gas flows out of combustion chambers of the internal combustion engine into an exhaust-gas collector 19 which can be designed as an exhaust-gas manifold. The exhaust gas passes from the exhaust-gas collector 19 via the inlet portion 17, and therefore also via the reactant-metering device 7, into the turbine 13 and from the latter in turn to the catalytic converter device 5. From the catalytic converter device 5, the exhaust gas flows further, wherein it is possible for at least one further exhaust-gas aftertreatment component to be contained by the exhaust-gas aftertreatment system 3, or for the exhaust gas to flow directly to an outlet of the exhaust-gas aftertreatment system 3, in particular to an exhaust pipe of the internal combustion engine 1. It is also possible for at least one further exhaust-gas aftertreatment component to be provided upstream of the catalytic converter device 5 illustrated here.

The turbine 13 serves as part of a mixing section for the intimate thorough mixing of the reactant with the exhaust gas. Since such a thorough mixing takes place very efficiently in the turbine 13, the length of the mixing section as a whole can be significantly reduced. At the same time, it becomes clear that a high flow rate prevails in the inlet portion 17 of the turbine 13, and therefore high aerodynamic shearing forces occur at the reactant-metering device 7, said shearing forces promoting an efficient formation of spray with very good spray properties.

Figure 2:
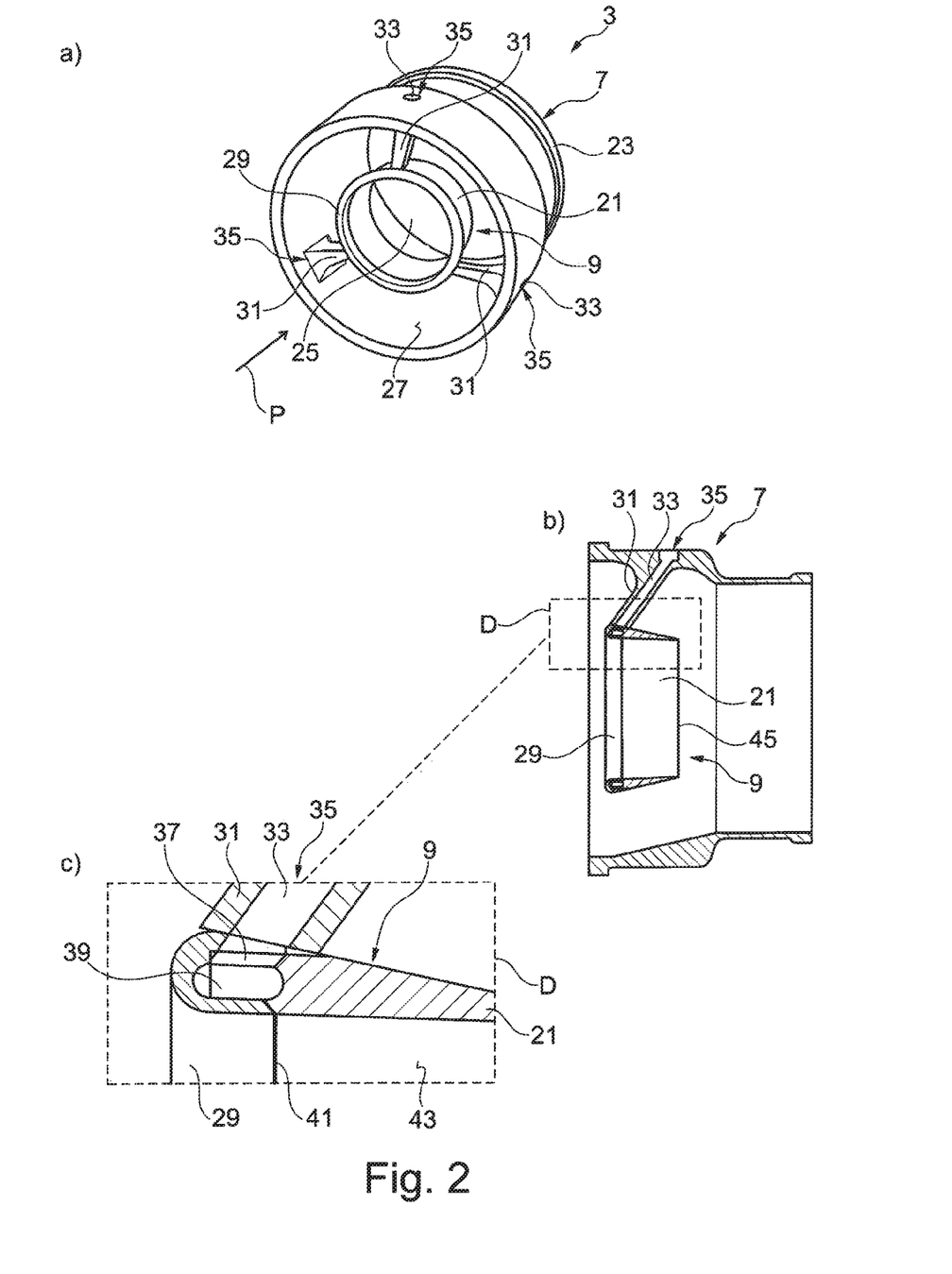
FIG. 2 shows various detailed views of a first exemplary embodiment of an exhaust-gas aftertreatment system.

FIG. 2 shows, in a plurality of detailed views, a first exemplary embodiment of the exhaust-gas aftertreatment system 3, here in particular a first exemplary embodiment of the reactant-metering device 7, and in particular the exemplary embodiment which is also illustrated in FIG. 1. Identical and functionally identical elements are provided with the same reference signs, and therefore in this respect reference is made to the previous description. The exhaust-gas flow nozzle 9 has, according to FIG. 2a), a film applicator 21, wherein the latter, in the case of the exemplary embodiment illustrated here, is arranged—as seen in the circumferential direction—in a manner concentrically encircling a main flow direction of the exhaust gas (illustrated by an arrow P) in a line portion 23, which is formed here by the reactant-metering device 7, of the exhaust-gas aftertreatment system 3. During operation of the internal combustion engine 1, the exhaust gas flows here through a radially inner region engaged around by the film applicator 21, wherein said exhaust gas at the same time flows around the film applicator 21 in a radially outer region. The film applicator 21 mainly engages on one side around a central recess 25 through which exhaust gas can flow, wherein the flow applicator is arranged and in particular held in the line portion 23 at a radial distance from an inner wall 27 thereof.

At its end oriented upstream, the film applicator 21 is fluidically connected to a concentrically encircling annular channel 29 for supply with reactant. It is in particular provided here that the annular channel 29 supports the film applicator 21.

The annular channel 29 is, for its part, held here in its central position in the line portion 23 by three webs 31 which—as seen in the circumferential direction—are arranged at an identical angular distance from one another, i.e. in particular in a rotationally symmetrical manner, wherein each of the webs 31 here has a passage bore 33 which serves for supplying the annular channel 29 with reactant. The annular channel 29 is preferably divided into three separate chambers, wherein a chamber is assigned to each of the webs 31. The chambers are fluidically separated from one another, and therefore each chamber can be supplied with reactant separately via the web 31 assigned to said chamber.

In this respect, feed lines 35 are provided for feeding reactant to the at least one film applicator 21, said feed lines comprising the passage bores 33. At least one of the feed lines 35 is preferably designed to be switchable. Particularly preferably, each of the feed lines 35 is designed to be switchable. A switchable feed line 35—preferably each switchable feed line 35—preferably has an activatable valve, by means of which the feed line 35 is blockable and releasable. Particularly preferably, an—in particular continuous—change in a throughflow cross section of the switchable feed line 35 is possible. The latter is then designed in particular to be controllable or regulable. Very simple metering of the reactant is thereby possible. In particular, reactant can preferably be supplied separately to each of the three chambers of the annular channel 29, or a feed line to the chamber can also be blocked.

FIG. 2b) shows a schematic sectional view through the reactant-metering device 7 according to FIG. 2a). In particular the film applicator 21, the annular channel 29, one of the webs 31 and the passage bore 33 formed in the web 31, and therefore also the feed line 35, can be seen here. The letter D denotes a detailed excerpt which is explained in more detail in FIG. 2c).

FIG. 2c) shows the detailed excerpt D according to FIG. 2b) in an enlarged illustration. Identical and functionally identical elements are provided with the same reference signs, and therefore reference is made in this respect to the previous description. It is shown here that the film applicator 21 has been inserted into the annular channel 29, wherein said film applicator extends in particular with a tongue 37 into the annular channel 29 and is held, preferably clamped, there. It is also possible for the tongue 37 to serve merely for orienting the film applicator 21 relative to the annular channel 29. At any rate, it is possible for the film applicator 21 to additionally or alternatively be connected to the annular channel 29, and in particular fastened thereto, in a form-fitting, frictionally engaging, or integrally bonded manner and/or by suitable connecting means, such that the annular channel 29 supports the film applicator 21. The tongue 37 is preferably provided with bores at predetermined positions—as seen in the circumferential direction—and therefore reactant can flow through the webs 31 into an interior 39 of the annular channel 29, in particular into chambers of the annular channel 29. Three bores which, in the mounted state, align with the passage bores 33 are preferably provided in the tongue 37. It is also possible for such a film applicator 21 to be produced integrally together with the annular channel 29 and optionally with its fastenings and feed lines in a generative manufacturing process, for example by means of 3D printing.

In the exemplary embodiment illustrated, in the mounted state a gap 41 remains between the annular channel 29 and the film applicator 21 on an inner side which faces an imaginary center axis of the main flow direction of the exhaust gas, through which gap reactant can flow out onto a film application surface 43 of the film applicator 21. The reactant passes on said film application surface 43 to a shearing edge 45 of the film applicator 21, which shearing edge is illustrated in FIG. 2b). The reactant is sheared off here by the aerodynamic forces of the exhaust gas and atomized. Alternatively or additionally to the gap 41, a series or an array of bores is also possible.

The gap 41 is formed radially on the inside here. Additionally or alternatively, it is also possible for the gap 41 to be formed radially on the outside such that the film application surface 43 is designed as the outer surface of the film applicator 21.

Figure 3:
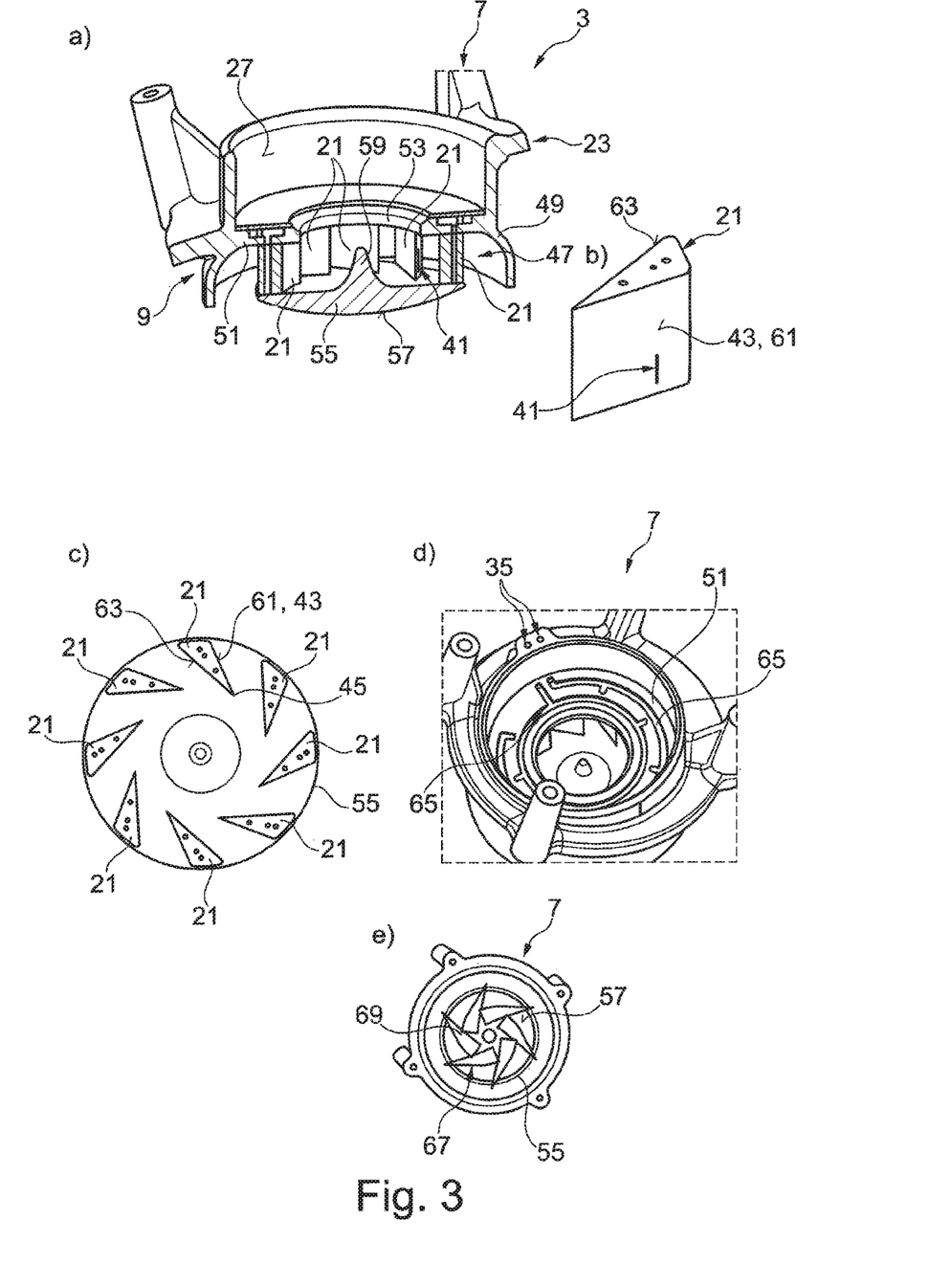
FIG. 3 shows various detailed views of a second exemplary embodiment of an exhaust-gas aftertreatment system.

FIG. 3 shows a plurality of detailed illustrations of a second exemplary embodiment of the exhaust-gas aftertreatment system 3 and in particular of a second exemplary embodiment of a reactant-metering device 7. Identical and functionally identical elements are provided with the same reference signs, and therefore reference is made in this respect to the previous description.

It is shown here in particular in FIG. 3a) and FIG. 3c) that the reactant-metering device 7 has a plurality of film applicators 21 which are arranged as—as seen in the circumferential direction—exhaust-gas-conducting elements which are spaced apart from one another on a swirl-generating device 47 for the exhaust gas. The swirl-generating device 47 is configured here in order to radially deflect the exhaust gas in regions. The film applicators 21 are configured here in order to impart a swirl to the exhaust gas flowing radially between them. In particular, the film applicators are designed as guide vanes for the exhaust gas.

In the exemplary embodiment of the reactant-metering device 7 that is illustrated here, the line portion 23 has a constriction 49 which is formed by a mounting plate 51 which protrudes radially inward from the inner wall 27 and has a central recess 53. The film applicators 21 are arranged here between the mounting plate 51 and a baffle plate 55, wherein the film applicators 21 are in particular supported by the mounting plate 51, wherein the film applicators 21, for their part, support the baffle plate 55. The baffle plate 55 has an end side 57 which faces the approaching exhaust-gas flow and is configured convexly, in particular curved, here. On an end surface facing away from the end side 57 and therefore from the approaching exhaust gas, the baffle plate 55 has a central bead 59 which serves for a second deflection of the exhaust gas, this time in the axial direction.

Approaching exhaust gas is directed radially outward by the curved baffle plate 55 where it is then deflected radially by the constriction 49 and flows between the film applicators 21 which impart a swirl to the exhaust gas. Assisted by the bead 59, the exhaust gas is in turn deflected in the axial direction and flows through the recess 53. The film applicators 21 serve here as guide vanes for the exhaust gas.

FIG. 3b) shows an enlarged illustration of a film applicator 21. It can be seen here that each of the film applicators 21 here preferably has a gap 41 for supplying the film application surface 43 with reactant, wherein a pressure counter surface 61 of the film applicators 21 is designed here as a film application surface 43. Alternatively or additionally, it is possible for a pressure surface 63 of the film applicators 21 to be designed as a film application surface 43, wherein a gap 41 is then provided in the pressure surface 63. It is also possible for not each of the exhaust-gas-conducting elements to be designed as film applicators. The gap 41 is not provided in the case of an exhaust-gas-conducting element which is not designed as a film applicator. Alternatively or additionally to the gap 41, a series or an array of bores is also possible.

FIG. 3c) shows a schematic top view of the assembly of the baffle plate 55 with the film applicators 21. Identical and functionally identical elements are provided with the same reference signs, and therefore in this respect reference is made to the previous description. In particular, the following is shown here: if the pressure counter surface 61 is used as a film application surface 43, in particular relatively large droplets of the reactant that are detached from the shearing edge 45 impact against an opposite pressure surface 63 of an adjacent film applicator 21 and wet said pressure surface. In this manner, the opposite pressure surface 63 acts, for its part, in turn as a film application surface, wherein the droplets which have impacted in such a manner are in turn atomized at the shearing edge 45—and this time more finely. The spray properties of the exhaust-gas flow nozzle 9 can thereby be further improved.

FIG. 3d) shows a further view of the second exemplary embodiment of the reactant-metering device 7. Identical and functionally identical elements are provided with the same reference signs, and therefore reference is made in this respect to the previous description. Two feed lines 35 for reactant can be seen here. The latter are fluidically connected to two grooves 65 which are separated fluidically from each other and are arranged in the mounting plate 51, wherein each of the grooves 65 supplies a certain number or group of film applicators 21 with reaction medium. Film applicators 21 which are directly adjacent to one another are supplied with reactant here by various grooves 65. Each of the grooves 65 in each case supplies four film applicators of the total of eight film applicators present here with reactant. As already indicated, the supply takes place in an alternating manner—as seen in the circumferential direction—by means of the various grooves 65.

FIG. 3e) shows a schematic illustration of a modification of the second exemplary embodiment of the reactant-metering device 7. A swirl-generating means 67 having a plurality of guide vanes, of which only one is denoted here, for better clarity, with the reference sign 69, is arranged here on the end side 57 of the baffle plate 55. The guide vanes 69 bring about particularly efficient deflection of the exhaust gas radially outward in the region of the end side 57 and, in addition, already impart a swirl to the exhaust gas before the latter flows into the swirl-generating device 47 and obtains swirling by means of the film applicators 21.

Figure 4:
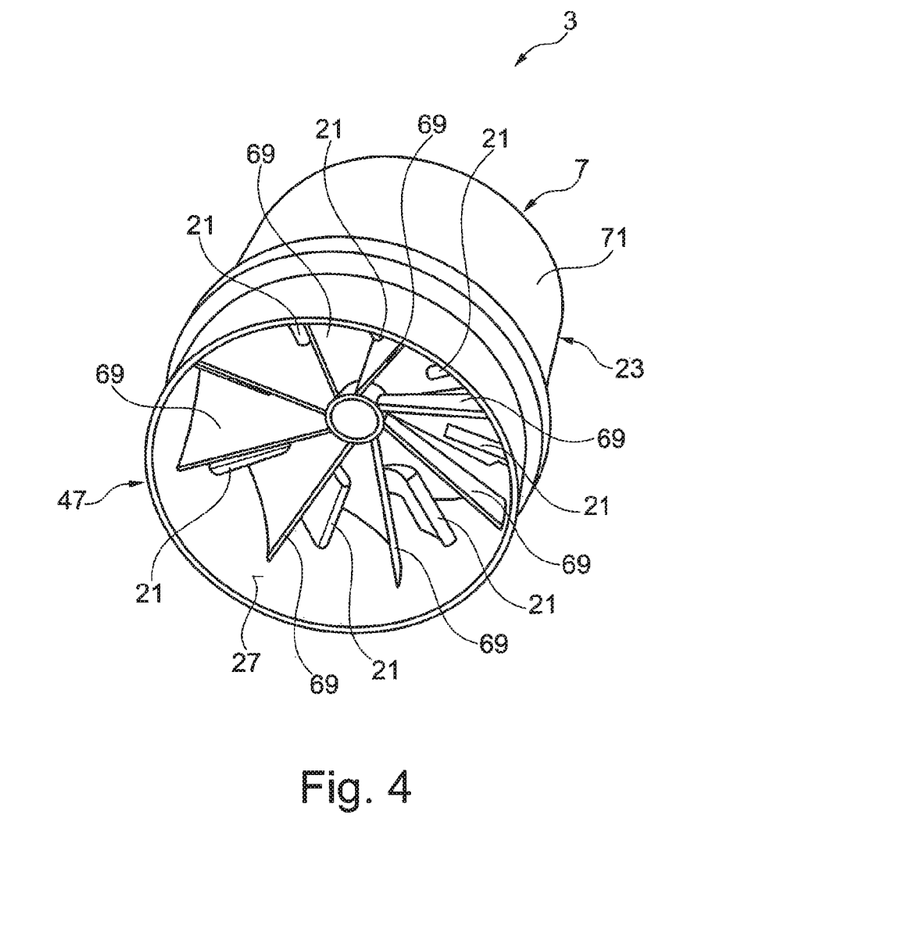
FIG. 4 shows a detailed view of a third exemplary embodiment of an exhaust-gas aftertreatment system.

FIG. 4 shows a schematic illustration of a third exemplary embodiment of an exhaust-gas aftertreatment system 3 and in particular of a reactant-metering device 7. Identical and functionally identical elements are provided with the same reference signs, and therefore reference is made in this respect to the previous description. The reactant-metering device 7 here also has a plurality of film applicators 21 which are also arranged as—as seen in the circumferential direction—exhaust-gas-conducting elements which are spaced apart from one another on a swirl-generating device 47 for the exhaust gas, wherein the swirl-generating device 47 is configured in order to radially deflect the exhaust gas in regions, and wherein the film applicators 21 are configured in order to impart a swirl to the exhaust gas flowing radially between them. However, the film applicators 21 are arranged here on the inner wall 27, which is an inner circumferential wall of the line portion 23, and are preferably fastened there, wherein the film applicators 21 are arranged between guide vanes 69. The film applicators 21 are also designed themselves as guide vanes, but the guide vanes 69 which are arranged between the film applicators are preferably designed here to be larger than the film applicators 21.

The film applicators 21 are preferably supplied with reactant via a wall 71 of the line portion 23.

It has been shown overall that, with the aid of the exhaust-gas aftertreatment system 3 and the internal combustion engine and in particular with the aid of the reactant-metering device 7, which is designed as an exhaust-gas flow nozzle 9, very efficient, reliable atomization of a reactant can be realized with a comparatively low degree of complexity and in a cost-effective manner.

The invention claimed is:

1. An exhaust-gas aftertreatment system for an internal combustion engine, comprising
   a catalytic converter device configured for catalytic conversion of at least one exhaust-gas component with a reactant; and
   a reactant-metering device arranged upstream of the catalytic converter device, as seen along a flow path of exhaust gas through the exhaust-gas aftertreatment system, wherein the reactant-metering device includes at least one exhaust-gas flow nozzle wherein the exhaust-gas flow nozzle is an air flow nozzle driven by exhaust gas and has at least one film applicator with a shearing edge, wherein the at least one film applicator is configured so that a liquid film is applicable to the film applicator and is drivable by a shearing stress to the shearing edge of the film applicator, wherein the shearing edge is configured so that the liquid film is sheared off by aerodynamic gas forces and the liquid film is atomized.

2. The exhaust-gas aftertreatment system according to claim 1, further comprising a turbine arranged upstream of the catalytic converter device, wherein the reactant-metering device is arranged upstream of the turbine.

3. The exhaust-gas aftertreatment system according to claim 2, wherein the turbine is a turbocharger.

4. The exhaust-gas aftertreatment system according to claim 2, wherein the reactant-metering device is arranged in or on an inlet portion of the turbine or is integrated in the inlet portion.

5. The exhaust-gas aftertreatment system according to claim 1, wherein the reactant-metering device is arranged in an exhaust-gas pipe, in an exhaust-gas collector or an exhaust-gas manifold.

6. The exhaust-gas aftertreatment system according to claim 1, wherein the at least one film applicator, as seen in a circumferential direction, is arranged to concentrically encircle a main flow direction of the exhaust gas in a line portion of the exhaust-gas aftertreatment system, wherein the film applicator is fluidically connected to a concentrically encircling annular channel for supplying reactant.

7. The exhaust-gas aftertreatment system according to claim 6, wherein the reactant-metering device includes a feed line for feeding reactant to the at least one film applicator.

8. The exhaust-gas aftertreatment system according to claim 7, wherein the feed line is switchable.

9. The exhaust-gas aftertreatment system according to claim 8, wherein the at least one feed line is controllable or regulable.

10. The exhaust-gas aftertreatment system according to claim 7, further comprising a flushing device for flushing the feed line.

11. The exhaust-gas aftertreatment system according to claim 1, further comprising a swirl-generating device for the exhaust gas, wherein the reactant-metering device has a plurality of exhaust-gas-conducting elements that, as seen in the circumferential direction, are arranged spaced apart from one another on the swirl-generating device, wherein the swirl-generating device is configured to deflect the exhaust gas radially in regions, wherein the exhaust-gas-conducting elements are configured to impart a swirl to the exhaust gas flowing radially around them, and wherein at least one of the exhaust-gas-conducting elements is a film applicator.

12. The exhaust-gas aftertreatment system according to claim 1, wherein the at least one film applicator is temperature-controllable.

13. The exhaust-gas aftertreatment system according to claim 12, wherein the film applicator is coolable and/or heatable.

14. The exhaust-gas aftertreatment system according to claim 1, wherein the reactant-metering device includes at least one swirl-generator to impart a swirl to the exhaust gas.

15. The exhaust-gas aftertreatment system according to claim 1, wherein the catalytic converter device is a catalytic converter for selective catalytic reduction of nitrogen oxides.

16. An internal combustion engine, comprising an exhaust-gas aftertreatment system according to claim 1.

17. The internal combustion engine according to claim 16, further comprising a turbocharger.

18. A method for operating an exhaust-gas aftertreatment system for an internal combustion engine, comprising the steps of:
　catalytically converting an exhaust gas component with a reactant in a catalytic converter; and
　using an exhaust gas driven air flow nozzle having at least one film applicator with a shearing edge in a reactant-metering device or as a reactant-metering device upstream of the catalytic converter, wherein a liquid film is applicable to the film applicator and is drivable by a shearing stress to the shearing edge of the film applicator, wherein the shearing edge is configured so that the liquid film is sheared off by aerodynamic gas forces and the liquid film is atomized.

* * * * *